Sept. 15, 1931.   H. C. VARNER ET AL   1,823,809
SIGNAL SWITCH FOR USE ON AUTOMOBILES
Filed Sept. 3, 1927
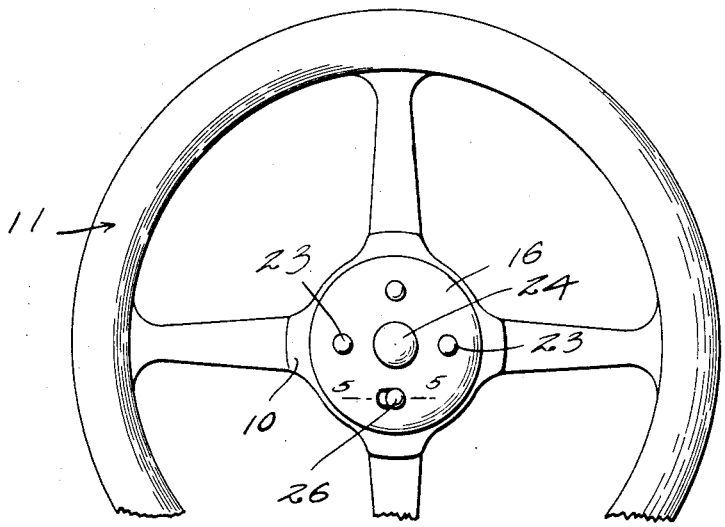
Fig-1-
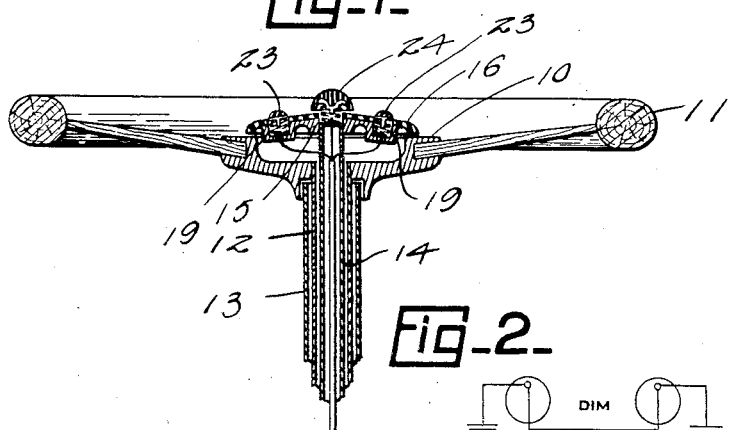
Fig-2-
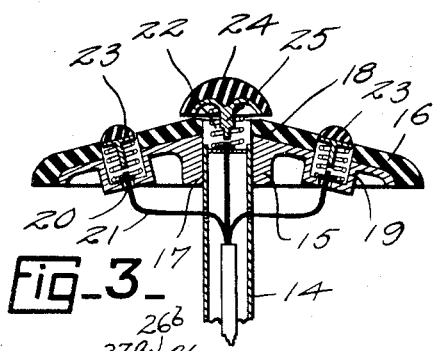
Fig-3-
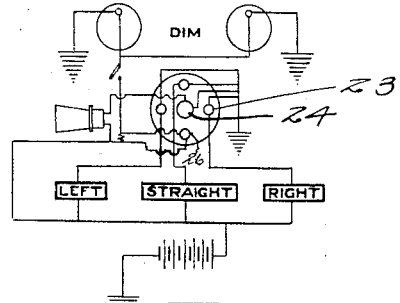
Fig-4-
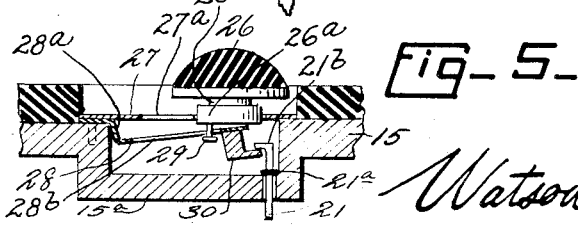
Fig-5-
INVENTOR.
H. C. Varner
J. M. Koch
BY
Watson E. Coleman ATTORNEY.

Patented Sept. 15, 1931

1,823,809

UNITED STATES PATENT OFFICE

HOWARD C. VARNER AND JACOB M. KOCH, OF ST. JOSEPH, MISSOURI

SIGNAL SWITCH FOR USE ON AUTOMOBILES

Application filed September 3, 1927. Serial No. 217,398.

This invention relates to signal switches for use on automobiles and more particularly to the production of a signal switch which may be very conveniently mounted and will present its switches at a readily accessible point.

A further and more specific object of the invention is to provide a switch mounting for the use specified which may be readily applied to the steering post mechanism of an automobile and which, when applied thereto, will present the supported switches in a convenient and readily accessible manner and will add to the appearance of the steering mechanism.

A further object is to provide a switch mounting of the character described supporting a plurality of button switches and in which the push button switches shall be disposed at all times in a definite and uniform position, so that the switch mounting may be applied to all makes of automobiles and provide for a standard disposition of the switches on practically all cars.

Another object is to provide a switch mounting as an article of manufacture having switches mounted therein, the article being adapted to be separately sold and which may be easily applied to the automobiles.

These and other objects we attain by the construction shown in the accompanying drawings, wherein for the purpose of illustration is shown a preferred embodiment of our invention and wherein:—

Figure 1 is a fragmentary plan view of a steering wheel having a switch mounting constructed in accordance with our invention applied thereto;

Figure 2 is a vertical sectional view therethrough;

Figure 3 is an enlarged sectional view through the switch mounting;

Figure 4 is a diagrammatic view showing the manner in which the particular switch mounting illustrated may be connected with the lights and signals of an automobile wiring circuit;

Figure 5 is a detail sectional view on the line 5—5 of Figure 1.

Referring now more particularly to the drawings, the numeral 10 generally designates the hub portion of a steering wheel 11. In the usual steering wheel mounting, the hub 10 is secured to the upper end of a rotatable post 12, which is enclosed exteriorly by a stationary post 13 and has arranged interiorly thereof a stationary tube 14, which projects upwardly slightly above the upper surface of the hub 10 and ordinarily provides a mounting for a horn button and a conduit for the horn button wiring.

In accordance with our invention, we provide a disk 15, the upper surface of which is convexed and provided with an insulating covering of some suitable material, such as bakelite, as indicated at 16. This disk is provided axially in its under surface with a socket 17 to receive and fit the upper end of the tube 14. In its upper surface, it is likewise provided with an axial socket 18, while about its surface is disposed a circumferential series of sockets 19. The bottom of each socket 18 and 19 is provided with an opening 20 for the insulated passage of a lead wire 21, and within each socket is disposed a spring 22, with one exception, the lower end of which electrically engages the bottom wall of the socket and the upper end of which engages the metallic base plate 23 of a push button 24. Each base plate has an axial extension 25 adapted, when the button is depressed against the action of its spring, to electrically engage the lead wire 20, entering the socket, thus completing a circuit from the wire to the base plate through the spring to the metallic disk 15 and thus to the stationary tube 14 which is usually grounded to the vehicle frame. The fixed contact with which the push button 24 cooperates to provide a switch is secured within and insulated from the tube 14, and the spring 22 which normally maintains this switch in opened position is arranged between the push button and the upper end of the tube.

In the socket 15ª noted as an exception, which is one of the socket series, there is provided a slidable switch element or button 26, as shown in Figure 5. A plate 27, extending over the socket 15ª, is secured to the upper side of the disc 15, and is provided with a slot 27ª. A spring 28, arranged in the socket 15ª and provided with an angular end portion 28ª, is secured through the medium of said end portion thereof to the upper side of the disc 15, and is supported by said end portion thereof in an inclined position with respect to the plate 27. The spring 28 is provided with a slot 28ᵇ extending in the direction of the slot 27ª and registering therewith. An angular contact 30 is secured to the upper or free end of the spring 28 and extends downwardly therefrom. The spring 28 supports the contact 30 in engagement with an angular contact 21ᵇ which constitutes an extension of the cable or lead wire 21 for the switch and which extends through the bottom of the socket 15ª and is insulated therefrom, as at 21ª. The button 26 is provided with a shank 26ª which passes through the slot 27ª of the plate 27 and supports the button for upward and downward movement and for lateral movement or in the direction of the length of the spring 28. A pin 29 extends downwardly from the lower end of the shank 26ª and through the slot 28ᵇ of the spring 28, and is provided at its lower end with a head which contacts with the under side of the spring and secures the button 26 to the spring. It will be seen that this construction is such that the button 26 may be manually depressed and moved laterally.

By depressing the button 26, the contact 30 is carried out of engagement with the contact 21, and by moving the button to the left, as viewed in Figure 5, an annular groove 26ᵇ in the shank 26 receives an end wall of the slot 27ª in the plate 27 to effect the latching of the button in its depressed position and consequent latching of the switch in opened position. When the button 26 is depressed, the spring 28 is under tension. When it is desired to close the switch, the button 26 is moved to the right to carry it out of latching engagement with the plate 27. The spring 28 is now released and moves the button 26 upwardly and at the same time raises the contact 30 into engagement with the contact 21ᵇ. If it is desired to maintain the switch closed, the button 26 is left in this position, and when the button is in this position, the switch may be momentarily opened by depressing and thereafter releasing the button.

It will be seen that we have provided a directional signal light system for automobiles of an extremely simple character and when operated, separate and distinct color lights may be flashed both at the front and rear, indicating the direction of travel. The disk containing the push buttons or switches is to be placed definitely at one point, namely, on the upper end of the steering column and the placing of this push button support with the switch signals is to be uniform in all cars, so that in all cars, there will be a definite position for each of the switches. Thus, under all circumstances, the center button is the horn signal only. The button above the horn button operates the straight signal only, the button to the right of the horn button operates the right directional signal only, the the button to the left of the horn button operates only the left directional signal, while the sliding button 26 which is always below the center horn button operates the dimmer control for headlights only. It is to be noted that the switch button mounting which we have devised does not rotate with the steering wheel, but at all times remains stationary, so that the various switch buttons are constant as regards position.

In Figure 2 we have illustrated diagrammatically the wiring to the lights, signals and horn, but obviously this wiring might be varied in many ways without departing from the spirit of our invention. It will be obvious that a construction of this character may be very readily and cheaply produced and may be very readily applied to the steering mechanism of the vehicle and connected with the wiring circuit thereof. It will also be obvious that certain changes are possible in the construction hereinbefore set forth and we accordingly do not limit ourselves to such specific structure except as hereinafter claimed.

We claim:—

A switch mounting for the stationary tube of a vehicle steering mechanism, comprising a disc fixed at its center to the upper end of the tube and provided beyond the tube with a socket, an angular contact secured within and insulated from the socket, a plate secured to the upper side of the disc over the socket and provided with a slot, a spring in the socket and provided with an angular end secured to the upper side of the disc, said end of the spring holding it in an upwardly inclined position with respect to the plate and the spring being provided with a slot extending in the general direction of the slot of the plate and registering therewith, an angular contact secured to the free end of the spring and extending downwardly therefrom for engagement with said fixed contact, a button having a shank passing through the slot in the plate to support the button for movement toward and away from the free end of the spring and to support the button for upward and downward movement, the shank being located above the spring and when opposite the free end of the spring permitting the spring to move its contact into engagement with said first contact, the button being adapted to be moved downwardly to depress the spring and thus carry the contact on the spring out of engagement with said first contact, the shank being provided with an annular groove adapted to receive an end wall of the slot when the button is depressed and moved away from the free end of the spring to hold the spring depressed and its contact out of engagement with said first contact, a pin extending downwardly from the lower end of the shank and passing through the slot in the spring and provided at a point below the spring with a head.

In testimony whereof we hereunto affix our signatures.

HOWARD C. VARNER.
JACOB M. KOCH.